(12) United States Patent
Lau et al.

(10) Patent No.: US 11,457,280 B2
(45) Date of Patent: Sep. 27, 2022

(54) BUNDLING OF VIDEO ASSET VARIANTS IN A DATABASE FOR VIDEO DELIVERY

(71) Applicant: HULU, LLC, Santa Monica, CA (US)

(72) Inventors: Ling Lau, Los Angeles, CA (US); Brandon Lonac, Edmonds, WA (US); Dallas Mahrt, Seattle, WA (US); Karthik Prasanna, Santa Monica, CA (US); Yingan Wang, Los Angeles, CA (US); Andres Rangel, Santa Monica, CA (US)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 16/560,916

(22) Filed: Sep. 4, 2019

(65) Prior Publication Data

US 2019/0394528 A1 Dec. 26, 2019

Related U.S. Application Data

(63) Continuation of application No. 15/399,699, filed on Jan. 5, 2017, now Pat. No. 10,425,691.

(51) Int. Cl.
| | |
|---|---|
| *H04N 21/4627* | (2011.01) |
| *H04N 21/472* | (2011.01) |
| *H04N 21/482* | (2011.01) |
| *H04N 21/437* | (2011.01) |
| *H04N 21/2187* | (2011.01) |
| *H04N 21/231* | (2011.01) |
| *H04N 21/8355* | (2011.01) |

(52) U.S. Cl.
CPC ..... *H04N 21/4627* (2013.01); *H04N 21/2187* (2013.01); *H04N 21/23109* (2013.01); *H04N 21/437* (2013.01); *H04N 21/47202* (2013.01); *H04N 21/47217* (2013.01); *H04N 21/4828* (2013.01); *H04N 21/8355* (2013.01)

(58) Field of Classification Search
CPC .......... H04N 21/4627; H04N 21/8355; H04N 21/2187; H04N 21/23109; H04N 21/437; H04N 21/47202; H04N 21/47217; H04N 21/4828
See application file for complete search history.

(56) References Cited

U.S. PATENT DOCUMENTS

| | | |
|---|---|---|
| 2009/0249429 A1 | 10/2009 | Sullivan et al. |
| 2011/0276677 A1 | 11/2011 | Osuga et al. |
| 2013/0312112 A1* | 11/2013 | Troiano ............. H04N 21/8355 726/27 |

(Continued)

*Primary Examiner* — Joshua D Taylor
(74) *Attorney, Agent, or Firm* — Kwan & Olynick LLP

(57) ABSTRACT

In one embodiment, a method receives a first bundle and a second bundle for a video based on metadata for the video. The method stores the second bundle with a dependency on the first bundle when the second bundle is associated with a first set of control data parameters found in the first bundle that control a first aspect of access to the video. The second bundle is stored with a second set of control data parameters to control a second aspect of access to the video. When the first bundle is selected, the method accesses the first set of control data parameters for the first bundle. When the second bundle is selected, the method accesses the first set of control data parameters in the first bundle via the dependency to the first bundle and the second set of control data parameters for the second bundle.

21 Claims, 9 Drawing Sheets

(56) References Cited

U.S. PATENT DOCUMENTS

| | | |
|---|---|---|
| 2014/0006951 A1 | 1/2014 | Hunter |
| 2015/0012383 A1* | 1/2015 | Touboul ............. G06Q 30/0609 |
| | | 705/26.35 |
| 2015/0181266 A1* | 6/2015 | Tang .................. H04N 21/4627 |
| | | 725/28 |
| 2015/0288996 A1 | 10/2015 | van der Schaar et al. |
| 2016/0269791 A1 | 9/2016 | Laczynski et al. |
| 2018/0089299 A1* | 3/2018 | Collins ................ G06F 16/282 |
| 2018/0192134 A1 | 7/2018 | Lau et al. |
| 2018/0359477 A1* | 12/2018 | Yang ................... H04N 19/139 |

* cited by examiner

BUNDLING OF VIDEO ASSET VARIANTS IN A DATABASE FOR VIDEO DELIVERY

CROSS REFERENCE TO RELATED APPLICATIONS

This application is a continuation application and, pursuant to 35 U.S.C. § 120, is entitled to and claims the benefit of earlier filed application U.S. application Ser. No. 15/399,699 filed Jan. 5, 2017, the content of which is incorporated herein by reference in its entirety for all purposes.

BACKGROUND

A video delivery service may offer a catalog of videos that a user can view. In one example, the video delivery service may support only one model of video delivery, such as video on demand (VOD), which offers videos that users can request on-demand.

To keep track of the videos in the catalog, the video delivery service may generate a database to manage the different videos. Because only video on demand is provided, each individual video may be modeled on the video asset level. That is, for a television show that had an episode that is episode #1 of season #3, an entry for that episode would be modeled in the database. For every other video asset (e.g., episodes, movies, etc.), the database would store another entry for each video asset. Additionally, the video delivery service would generate a file for each video asset for every corresponding entry in the database.

The database allows the video delivery service to offer a browse and/or search function over the catalog at the video asset level. For example, a user may search for episode #1, season #3 for the television show. Given the discrete number of video assets being offered by the video delivery service, this method of modeling the video assets in the database may work for the video delivery service.

DETAILED DESCRIPTION

Described herein are techniques for a video asset database system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

A video delivery service may support different types of video delivery methods, such as video on demand, live streaming, and live recording. Within each different method, a video asset may also have different variations that affect the delivery of the videos, such as different variations for different access mechanisms, location, and feature rights. Using the method of storing a file for each different variation of the video asset would require copies of the file for each variation to be generated and stored. This may significantly increase the amount of information that the video delivery service needs to store in its catalog database. Accordingly, particular embodiments use a bundle concept that includes a tiered model for storing the bundles in the database. The first tier is a video entity that can be then broken into different video delivery models in a second tier. Each delivery model for a video entity is considered a video asset. Then, each video asset may have different variations within the respective delivery model. The database models the variants as bundles in a third tier. The bundles may re-use information from other bundles within the video asset. This allows the video delivery service to more efficiently store metadata for different video assets in the video catalog. Additionally, whereas a browse-and-search function may have been available only on the video asset level, now the video delivery service can offer a browse-and-search function at the bundle concept layer.

Figure 1:
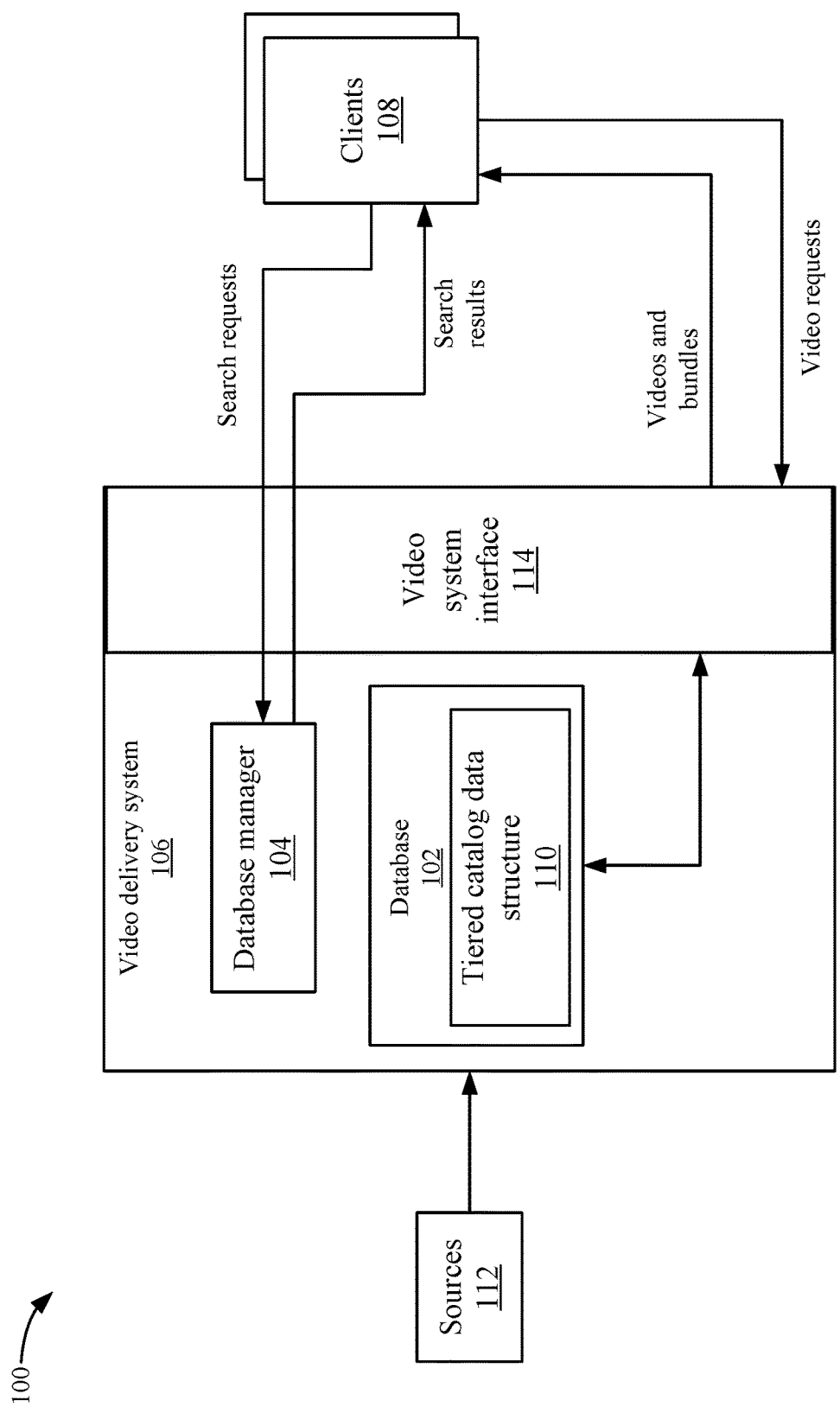
FIG. 1 depicts a simplified system for managing a catalog of videos for the video delivery service according to one embodiment.

FIG. 1 depicts a simplified system 100 for managing a catalog of videos for the video delivery service according to one embodiment. A video delivery system 106 includes a database 102 and a database manager 104. Clients 108 may communicate with video delivery system 106 to search for videos, request videos, and receive videos for playing on a media player of clients 108.

Video delivery system 106 may receive videos from sources 112. For example, the video delivery service receives a video for an episode for a show. Sources 112 may also provide information that is used to create a tiered catalog data structure 110. The information includes which videos will be published via video on demand, electronic program guide (EPG) metadata that provides information about the videos, a live stream in band metadata feed that describes a schedule of when live videos are available.

The video delivery service can then expose different video assets for a video entity associated with the received video. A video entity may be a high-level concept that may encompass the video. For example, the video may be a specific episode of a show, a movie, a short, or other aspects of a video. A video asset may be a variation of the video, such as a video on demand video asset, a live-stream video asset, and a recorded video asset. For example, video on demand is a video that can be requested at any time and be delivered to a user. A live-stream video is a video which the user may watch live at a certain time when the video is live and streaming. When the video is not live, the user cannot watch the live-stream video. Recorded video is video that has been recorded by the user or by some other user that the user can request to watch.

Different video assets for the same video entity may be associated with different variations within an associated type of video delivery. The variations may include different variations on control data parameters for the video asset, such as an access mechanism, availability, and feature rights. Each different variation of control data parameters may be formed into a bundle. Database 102 can then store the bundles in a tiered catalog data structure 110. Tiered catalog data structure 110 may define the control data parameters for respective different video assets for each video entity using bundles. The concept of the bundles will be described in more detail below.

Clients 108 may request various services from the catalog offered by video delivery system 106 via a video system interface 114. For example, clients 108 may search for videos found in the catalog. In this case, video delivery system 106 may receive a search request from client 108 via video system interface 114. For example, a user may browse for videos in a user interface or input a search query. A database manager 104 may process the request by accessing database 102. In this case, database manager 104 may search at the video asset level and/or the bundle level. For example, database manager 104 may not only return the video asset, such as show #1, season #3, episode #1 as a search result, but database manager 104 may also return a search result that indicates there is a video on demand variation and/or a live-stream version available. The different variations may be even more complicated as the features of each bundle are used to select different bundles to return in search results.

Once client 108 determines which bundle to watch, client 108 may send a video request to play a video associated with a bundle to video delivery system 106. Then, video system interface 114 may cause a video that is associated with the bundle to play on a media player of client 108. Additionally, video system interface 114 may return the metadata for the bundle to client 108, which can then use the metadata to control playback of the video. For example, the metadata for the bundle may indicate geographical or time availability restrictions that a media player of client 108 may enforce.

Although searching of database 102 is described, video delivery system 106 may use tiered catalog data structure 110 to provide other functions. For example, video delivery system 106 may proactively determine which bundle may be most appropriate for a user of the video delivery service at a current time. In one example, a user may start watching a video on demand version of a video entity, but not finish it. At some point, the user may start watching the live version of the video entity. However, the user may not finish the live version. After the live stream ends, however, video delivery system 106 may receive the video on demand version, such as after 24 hours. Video delivery system 106 may then be able to suggest that the user start watching the video on demand version of the video entity at a later time. The use of bundles to capture the different variations of each video asset allows the video delivery service to provide inter-video asset recommendations.

Tiered Catalog Data Structure

Figure 2:
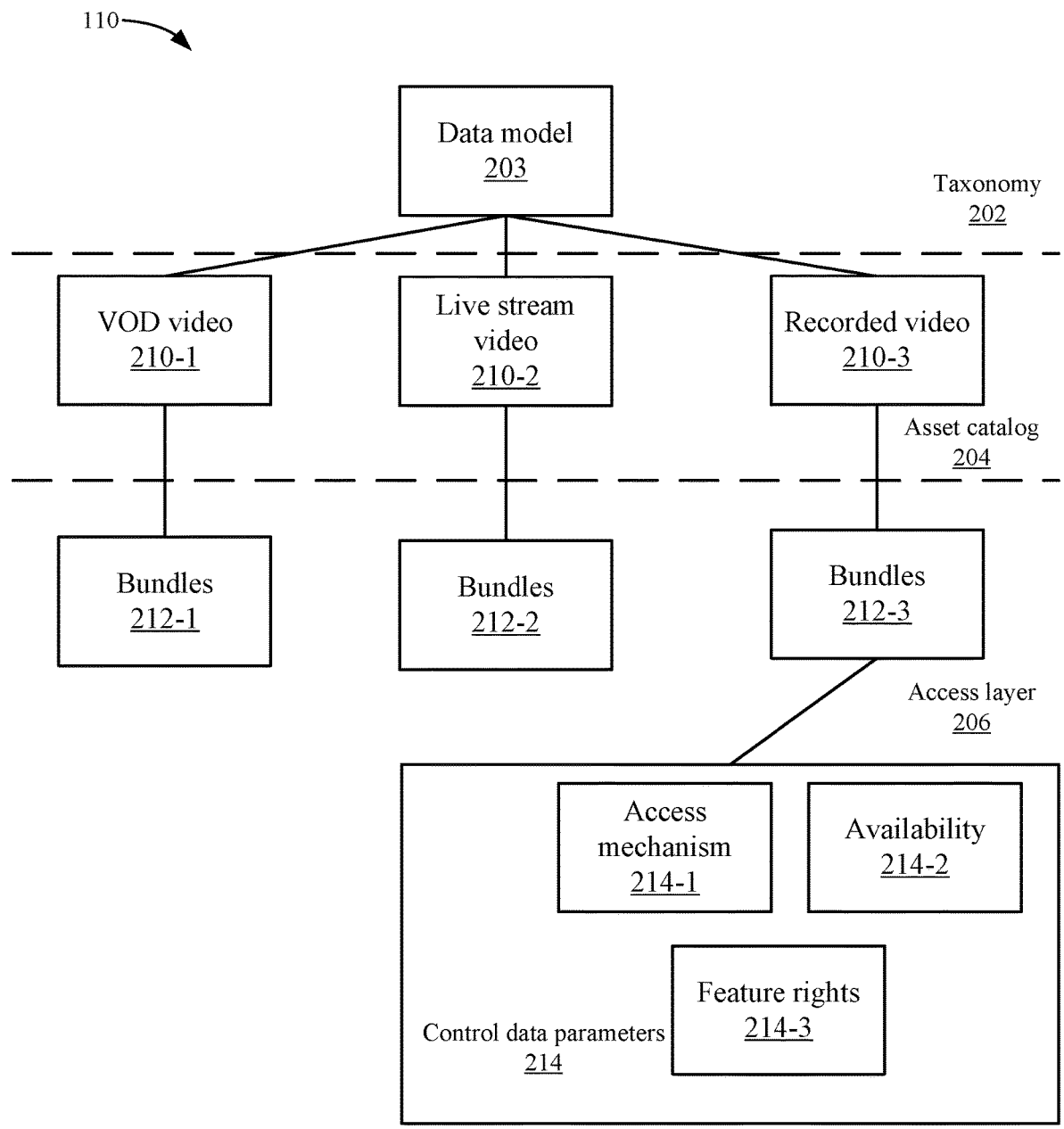
FIG. 2 depicts an example of a tiered catalog data structure according to one embodiment.

FIG. 2 depicts an example of tiered catalog data structure 110 according to one embodiment. In a first tier, a taxonomy 202 is defined for all the video assets in the entire tiered data structure. In a second tier, an asset catalog 204 describes the video assets associated with each video entity. In a third tier, an access layer 206 defines the bundles for each video asset.

Taxonomy 202 may define a data model 203 that organizes video entities and video assets in the asset catalog. Additionally, taxonomy 202 defines an interface that allows database manager 104 to access various levels of the tiered data structure. Data model 203 defines possible navigation among assets in the asset catalog by video characteristics. For example, data model 203 may organize the asset catalog by:

a. organizing the different videos into series and season for the shows on television;

b. organize the different videos into movies and franchises for the movies; and c. cross link related series, related movies, and related series and movies.

For example, data model 203 may be used to generate a list of current series and respective episodes for the series for the user to browse.

Asset catalog 204 includes video assets for multiple video entities. The video entity may be the top level for the video assets, such as a video entity is a specific video that can be viewed, such as a season #3, episode #1 of a television show. Another episode of the television show may be considered another video entity. Further, a movie may be another video entity. Accordingly, a show may have multiple video entities that can be modeled as video assets in asset catalog 204.

Each video entity may be broken down into different video assets 210, where each video asset is associated with a type of video delivery. For example, video assets 210 include a video on demand video 210-1, a live-stream video 210-2, and a recorded video 210-3. The video on demand video may be a video that can be requested on-demand by a user. The live-stream video is a video that can be watched live by a user at a certain specified time range. The recorded video may be a video that has been recorded by the user and can then be re-watched at a later time.

Connected to each video asset 210 are one or more bundles 212 in access layer 206. For example, bundles 212-1 are associated with video on demand (VOD) video 210-1; bundles 212-2 are associated with live-stream video 210-2; and bundles 212-3 are associated with recorded video 210-3. Not every video asset may have an associated bundle, however. For example, a bundle may only exist for a video on demand and live streaming, and not recorded video. In this case, a user may not have recorded a video and a bundle does not exist for the recorded video asset.

Each bundle may also be associated with control data parameters 214, which is metadata that is specific to each video asset. The control data parameters provide more information about specific video delivery than that included in the taxonomy layer. Examples of control data parameters 214 include an access mechanism 214-1, availability 214-2, and feature rights 214-3. Each set of bundles 212 may encapsulate a different control data parameters 214. For example, a bundle may specify whether this video is a live-stream asset or video on demand asset so a client 108 can apply different playback mechanisms. Also, the client can use the control data parameters to control access to the video through an availability window or control the feature rights to how or where the video may be accessed. Although the above control data parameters are discussed, the bundles may include other types of control data parameters.

Each bundle may encapsulate a different variation of the video asset. Further, some bundles may reuse information from other bundles if that is possible. Using bundles, a new file for a video asset does not need to be generated each time a different variation of a video asset is generated. The bundle concept defines which file to send to the user given a particular scenario. For example, an episode of a show has two video files (e.g., one with extra uncut scene and one without), and the video delivery system provides the video in these three scenarios:

Scenario A: video with extra uncut scene, target user group: video on demand.

Scenario B: video with extra uncut scene, target user group: recorded play back.

Scenario C: video without extra uncut scene, target user group: live playback.

Scenarios A and B use the same video file with the extra uncut scene, but in different video delivery methods. However, the video file can be reused between Scenario A and B. The other video file is used for Scenario C. Instead of storing three different files for the three different scenarios, only two files are stored.

Figure 3:
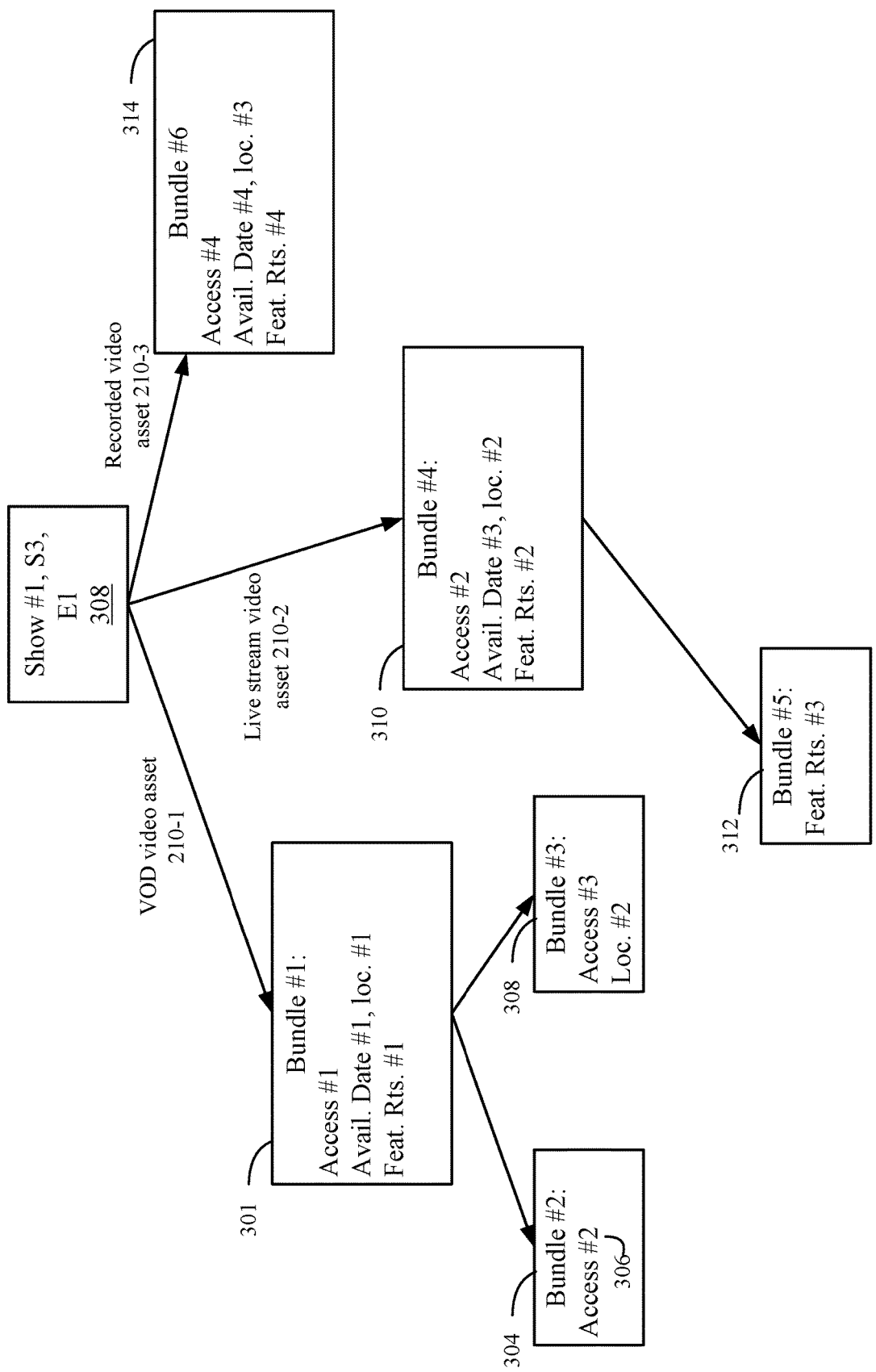
FIG. 3 shows an example of different bundles for a video entity according to one embodiment.

FIG. 3 shows an example of different bundles for a video entity according to one embodiment. A video entity 308 is shown as an episode #1 (E1) of a season #3 (S3) for a show #1. This may be an episode in a television show. The television show may have a video on demand video asset 210-1, a live-stream video asset 210-2, and a record video asset 210-3. Additionally, bundles may be included for each video asset 210-1-210-3; however, not all video assets may have an associated bundle. For example, if the user has not recorded any video, then recorded video 210-3 may not have an associated bundle.

At 301, a bundle #1 includes control data parameters for an access mechanism, availability, and feature rights. The access mechanism is an access mechanism #1. For example, the access mechanism may control which device can be used to access the video asset, such as a mobile device, living room device, desktop device, etc. The availability may be controlled via an availability date (e.g., availability date #1) and a location (e.g., location #1). This may specify that the video asset for bundle #1 may be available for a certain date range and in a certain geographical location. The feature rights may specify which package the video asset is available in, such a feature rights package #1. The different feature rights may be a paid package, a free package, a network package, etc.

At 304, the bundle #2 may depend off bundle #1. In this case, bundle #2 may use certain control data parameters from bundle #1, such as the availability and feature rights. However, at 306, an access mechanism #2 for bundle #2 is different from the access mechanism #1 for bundle #1. This means that bundle #2 differs from bundle #1 only with respect to the access mechanism. For example, a user may only access bundle #2 using a mobile device while bundle #1 may be accessed via all devices.

At 308, a bundle #3 depends off bundle #1. In this case, an access mechanism #3 in bundle #3 is different from access mechanism #1 in bundle #1. Also, the availability in bundle #3 has a different location #2 compared to location #1 in bundle #1. This may mean bundle #3 is accessible in a different geographical area compared to bundle #1.

Other video assets may also have a different set of bundles. For example, bundle #4 is shown at 310 for live-stream video asset 210-2. Bundle #4 may have an access mechanism #2, an availability date #3 and location #2, and a feature right package #2. At 312, bundle #5 depends off bundle #4 and includes a different feature rights #3 than bundle #4.

At 314, a bundle #6 is for recorded video 210-3. In this case, bundle #6 may include an access mechanism #4, an availability date #4 and location #3, and a feature right package #4. When a user records live video, this bundle #6 may be applied to the recorded video.

In one embodiment, each video asset may have its own bundles. The dependencies may exist within each video asset where dependencies between bundles from different video assets do not exist. That is, in one embodiment, video assets have their own bundles.

Bundles #1-#6 may be associated with the same video file. In this case, database 102 may indicate that bundles #1-#6 can reuse the same video file. In other embodiments, different bundles may be associated with different video files. For example, bundles #1-#5 may be associated with a first video file and bundle #6 may be associated with a second video file. This may be, for example, because the second video file has different content than the first video file. However, instead of having six different video files, only two video files need to be stored. The dependencies between bundles allow multiple bundles to use the same file as bundles that depend from one another. The dependencies may indicate which bundles require a new file.

Figure 4:
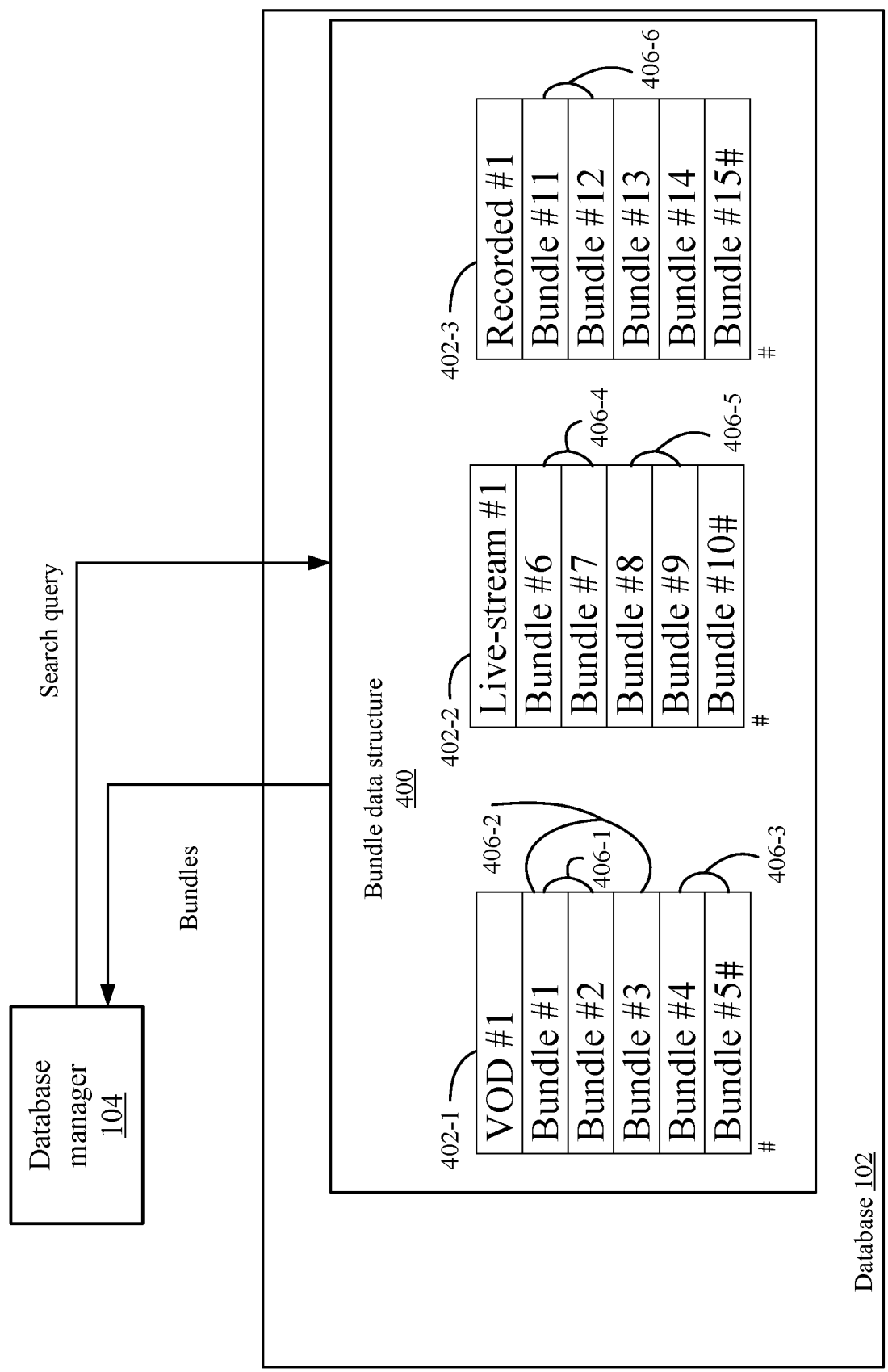
FIG. 4 depicts a more detailed example of a database according to one embodiment.

The bundles may be stored in database 102. Because the bundles depend from one another, a new file does not need to be re-stored for each different bundle variation. In one embodiment, when a bundle depends from a parent bundle, the bundle may re-use the control data parameters of the parent bundle except for whatever control data parameters that are changed in the bundle. In another embodiment, only the differences between the bundles can be stored in database 102. FIG. 4 depicts a more detailed example of database 102 according to one embodiment. The metadata for the bundles is stored in a bundle data structure 400, such as different video assets are stored in different columns 402-1-402-3 of a table. Although this data structure is shown, other data structure formats may be used.

The entries for video-assets and bundles are generated automatically. A video asset can be generated based on the taxonomical data defined in data model 203. For example, the data model defines which video assets are available for shows and movies. Bundles are created automatically based on metadata for the videos, such as electronic program guide (EPG) data, video on demand publish workflow, and other information.

A column 402-1, shows bundles for a video on demand asset #1 of a video entity. Each entry in column 402-1 includes control data parameters for a different bundle. Also, various dependencies 406 between the bundles are shown to indicate a bundle may be dependent on another bundle. In one example, a field in the bundles indicate a parent bundle from which the bundle depends. For example, bundle #2 is dependent on bundle #1 via a dependency 406-1 and bundle #3 is dependent on bundle #1 via a dependency 406-2. Further, bundle #5 is dependent on bundle #4 via a dependency 406-3. In one example, to support the personal recording function, a bundle B could depend on another bundle A via a parent bundle key. The parent bundle key uniquely identifies bundle A in the database. If a recording rule is created for a video, and the video has just finished playing in live playback, bundle A is created with a video file that represents what was played via live stream video. Database manager 104 creates a bundle B for the recorded video delivery and sets the parent bundle key to point to bundle A. The video file for bundle B can be reused from the video file for bundle A based on the reusability feature.

In a column 402-2, a live-stream video asset #1 is shown for the video entity. Bundles #6-#10 are stored in different entries in column 402-2. Different dependencies 406 may also be used for these bundles. For example, bundle #7 is related to bundle #6 via a dependency 406-4 and bundle #9 is related to bundle #8 via a dependency 406-5.

At 402-3, a column for a recorded video asset #1 is shown. Bundles #11-#15 are shown in video entries in column 402-3. A bundle #12 is dependent on bundle #11 via a dependency 406-6.

Services Using Bundles

Storing the bundles in database 102 exposes the bundles for different uses. For examples, a search process can access the bundles. Database manager 104 can receive a search query from a user and then search database 102 for a bundle that applies to the search query. Previously, database manager 104 may have only been able to search on the video entity level. This would only return the video on demand video, live-stream video, or recorded video. However, exposing the bundles in data structure 400 allows database manager 104 to search through the bundles to retrieve a control data parameters structure for the bundle. For example, database manager 104 may receive search parameters for the search including one or more of the access mechanism, time, location, and feature rights. This search goes beyond data in the taxonomy layer and the search parameters can include metadata on the video included in the bundles, such as quality, frame rate, access rights, or audio configuration. For example, the search on the taxonomy layer may be searches for the video asset for this series, or all the series aired this month. However, a search performed in the bundle layer can search for videos based on quality, frame rate, audio configuration, or the user access right model for the bundle. Database manager 104 can then select one or more bundles that satisfy the search parameters.

Once the bundle is determined, database manager 104 can return search results for the search query based on the bundles that satisfy the search query. For example, different possibilities for watching some of the video assets are returned.

The bundles can also be used by the video delivery service to manage the videos offered to users. For example, the video assets may expire or change, such as the video delivery service may receive more video assets for the same video entity, and the video delivery service can use the bundles to manage which video asset and bundle is provided to the user. Video delivery service 106 receives user status information regarding which videos the user has watched, favored, or may be interested in. Video delivery service 106 can then analyze the bundles in database 102 and select another bundle if appropriate. For example, a user may first start watching a live-stream of a video entity. Then, the user may stop halfway through the live-stream. However, a day later, the video delivery service may receive the video on demand version of the live-stream. The live-stream video asset may not be available any longer, though, for the user. Video delivery service 106 may then determine that the user should be offered the video on demand video asset. For example, bundle selection takes into all the different factors based on the context. In one example, a user has subscription to live video on demand, subscription video on demand, and recorded playback. When the user searches for a particular title, the video manager 104 may first search through taxonomy layer to find the best match video entity. Once video manager 104 locates the video entity (e.g., video title), video manager 104 inspects the account feature of the user to determine which bundle will provide the best viewing experience. For example, if a user prefers the recorded version of the asset, video manager 104 tries to start the playback with recorded video bundle, and grant the user the option to change into another bundle later.

Client Playback Using Bundles

Figure 5:
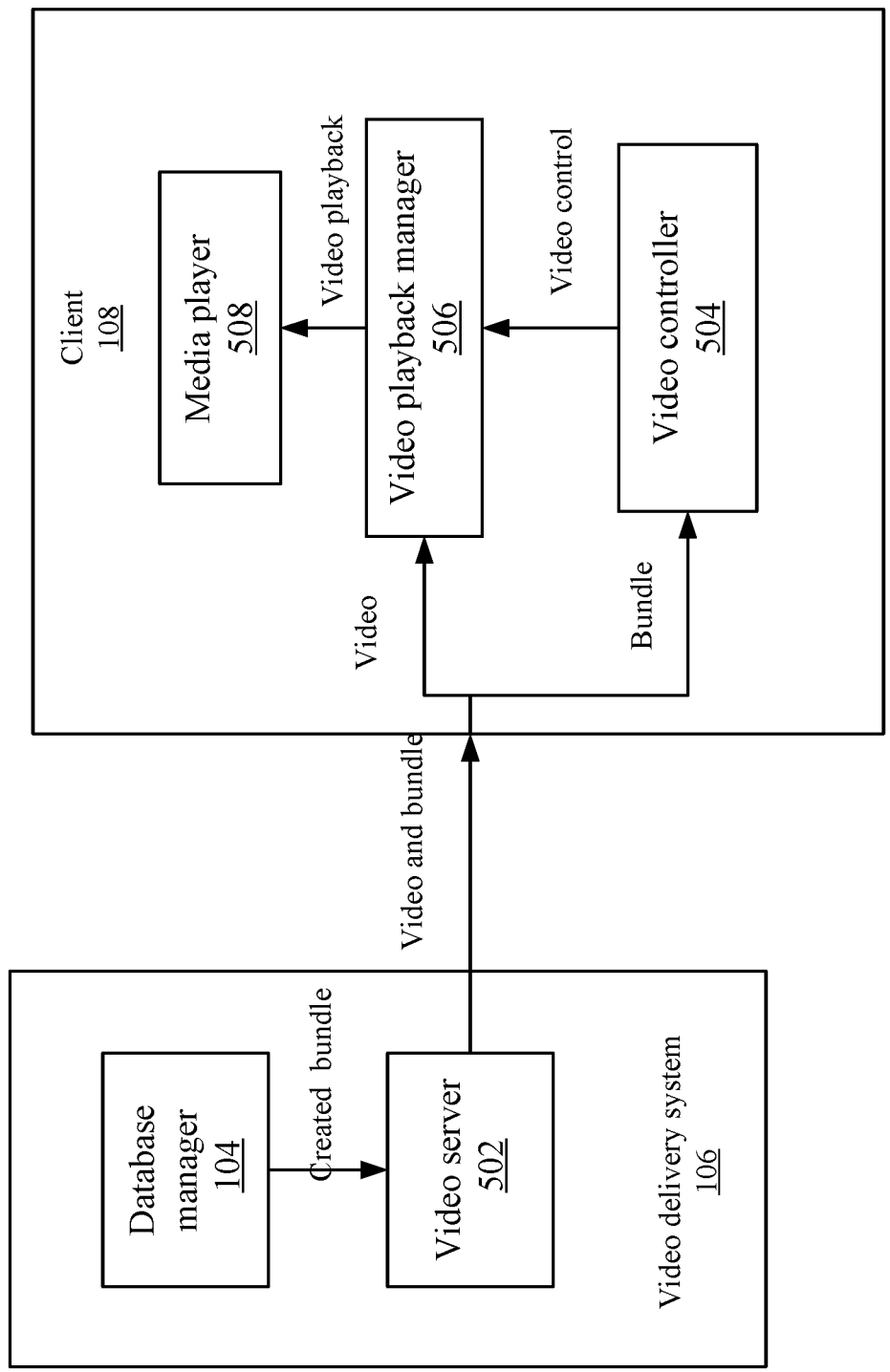
FIG. 5 depicts an example of the playback using bundles according to one embodiment.

Clients 108 may use the bundle to control the playback of a video. FIG. 5 depicts an example of the playback using bundles according to one embodiment. When a bundle is selected, database manager 104 may create the control data parameters for the bundle. In one embodiment, the bundle may include all of the applicable control data parameters. In another embodiment, the selected bundle may not include all of the control data parameters for that bundle. In this case, database manager 104 may traverse the dependencies in bundle data structure 400 to determine the control data parameters for the bundle from other bundles. For example, referring to FIG. 4, if bundle #2 is selected, then, dependency 406-1 is used to select bundle #1 also. The control data parameters from bundle #1 and bundle #2 is then used to generate a bundle for bundle #2. In this case, any changed control data parameters in bundle #2 will supersede original control data parameters in bundle #1. Bundle #2 changed the access mechanism from bundle #1 so the access mechanism from bundle #2 is used instead of the access mechanism for bundle #1. The availability date, location, and feature rights from bundle #1 are used, however. Database manager 104 may also use the dependencies to select a file that is associated with the bundle. For example, one file may be used for the bundles that depend on one another.

A video server 502 of video delivery system 106 delivers a video and a bundle for the video to a client 108. It will be understood that video server 502 may be part of a content delivery network separate from the video delivery service. In this case, the video delivery service causes delivery of the video via video server 502. The bundle contains information such as the availability window to control the client access to the video asset. For example, the availability window may be a date range in which the video may be played. Also, the bundle contains references to the information that controls the feature rights in the client. For example, a reference may be to a package that a user needs to subscribe to in order to play the video.

A video controller 504 in client 108 may receive the bundle and determine the control data parameters in the bundle. This includes determining the access mechanism, availability, and feature rights. A video playback manager 506 also receives the video, can buffer the video, and cause the video to play in a media player 508.

Video controller 504 may use the control data parameters for the bundle to control the playback of the video. For example, video controller 504 may determine if client 108 can play the video based on the location of the client and the location feature rights of the bundle.

Method Flows

Figure 6:
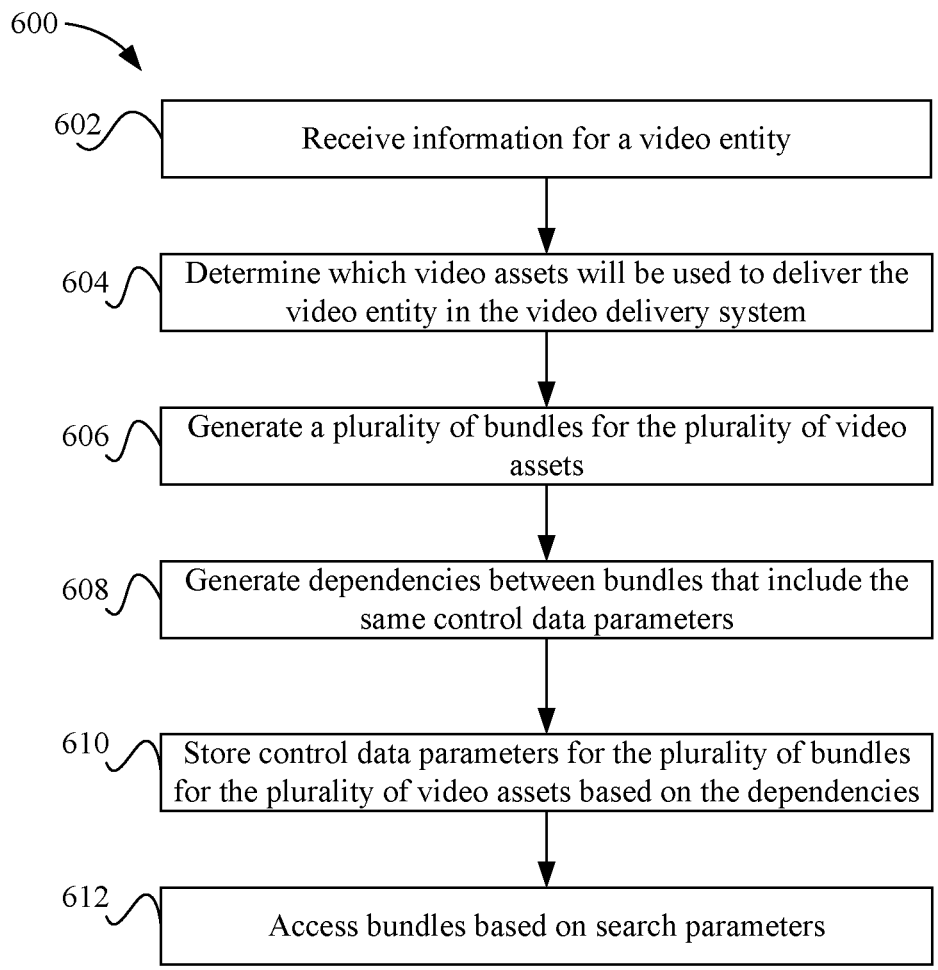
FIG. 6 depicts a simplified flowchart for a method of generating a data structure in database 102 according to one embodiment.

FIG. 6 depicts a simplified flowchart 600 for a method of generating a data structure in database 102 according to one embodiment. At 602, database manager 104 receives information for a video entity. At 604, database manager 104 determines which video assets will be used to deliver the video entity in the video delivery system.

At 606, database manager 104 generates a plurality of bundles for the plurality of video assets based on a data model defining a structure of database 102. Then, at 608, database manager 104 generates dependencies between bundles that include the same control data parameters. This allows database manager 104 to store bundles that reuse information from other bundles and to associate multiple bundles with a single file. At 608, database manager 104 stores control data parameters for the plurality of bundles for the plurality of video assets based on the dependencies.

Once storing the bundles, at 610, database manager 104 can access bundles based on search parameters. At 612, database manager 104 uses the dependencies to generate the control data parameters for the accessed bundles. For example, database manager 104 may combine control data parameters for multiple bundles to form the complete bundle.

Figure 7:
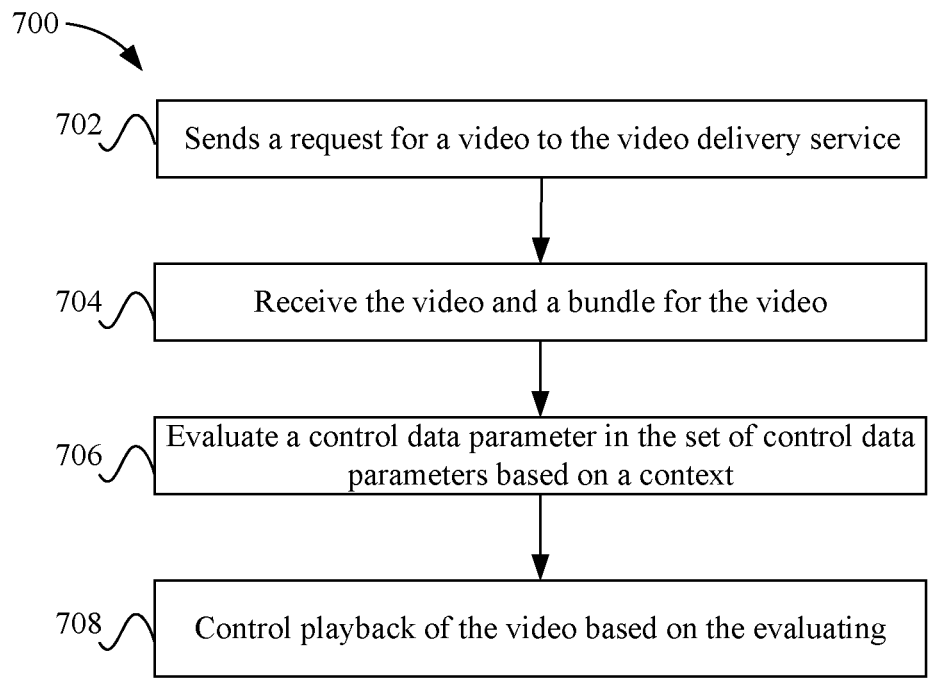
FIG. 7 depicts a simplified flowchart of a method for controlling playback of a video on a client using a bundle according to one embodiment.

FIG. 7 depicts a simplified flowchart 700 of a method for controlling playback of a video on a client 108 using a bundle according to one embodiment. At 702, client 108 sends a request for a video to the video delivery service. Video delivery service 106 processes the request and sends a video asset and associated bundle to client 108.

At 704, client 108 receives the video and a bundle for the video. The bundle includes a set of control data parameters for controlling playback of the video. At 706, client 108 evaluates a control data parameter in the set of control data parameters based on a context. For example the context may be a real-time context associated with the playback, such as a location of client 108 or time of day. Then, at 708, client 108 controls playback of the video based on the evaluating.

System Overview

Figure 8:
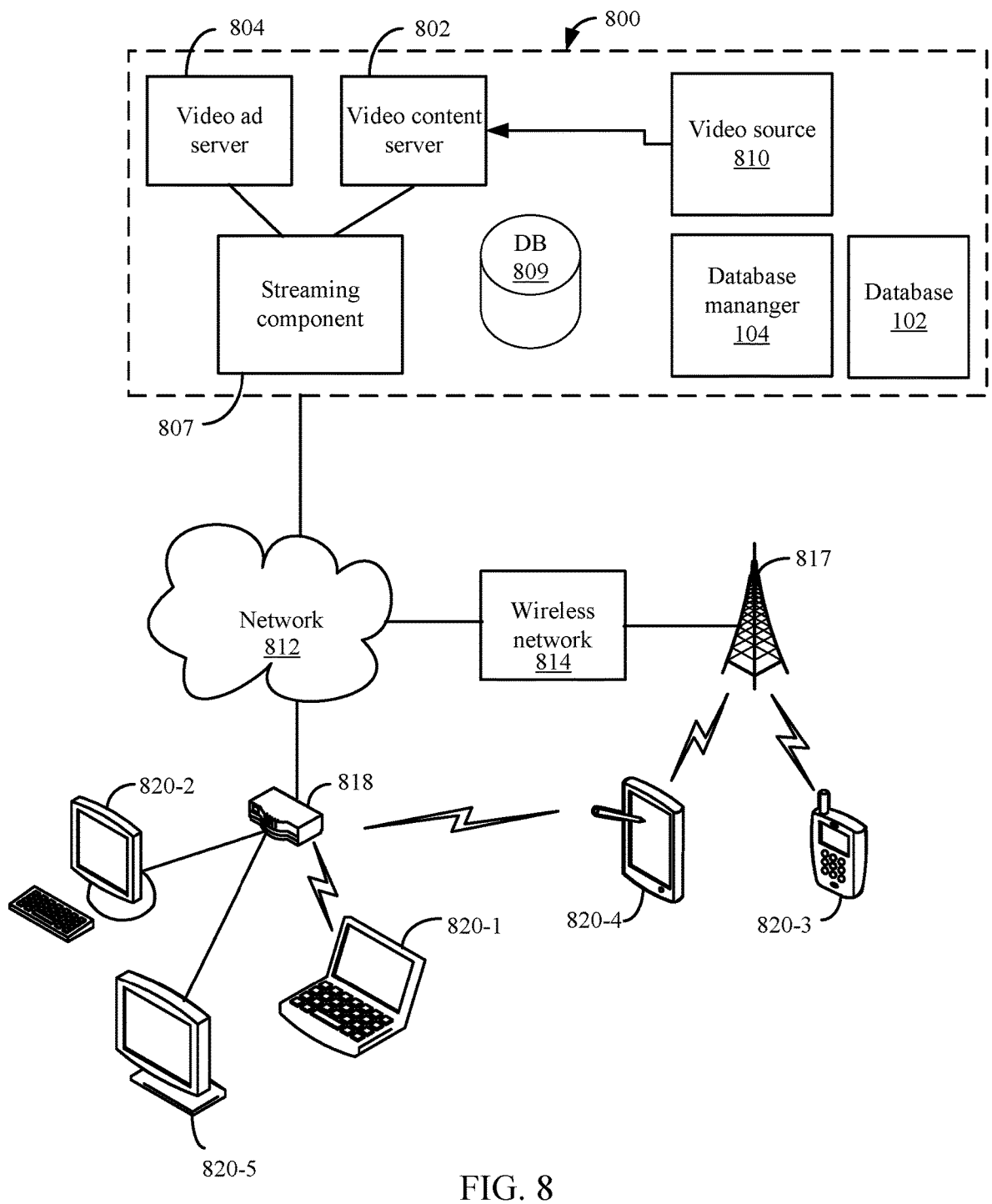
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and/or 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 800, a public service message, or some other information. The video advertising server 804 may serve the video advertising segments as directed by a user interface controller (not shown).

The video streaming system 800 also may include database manager 104 and database 102.

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network (WCS) 814, or some combination of these or similar networks.

One or more client devices 820 may be in communication with the video streaming system 800, via the data communication network 812 and/or other network 814. Such client devices may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 817 for a wireless telephony network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HTTP and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
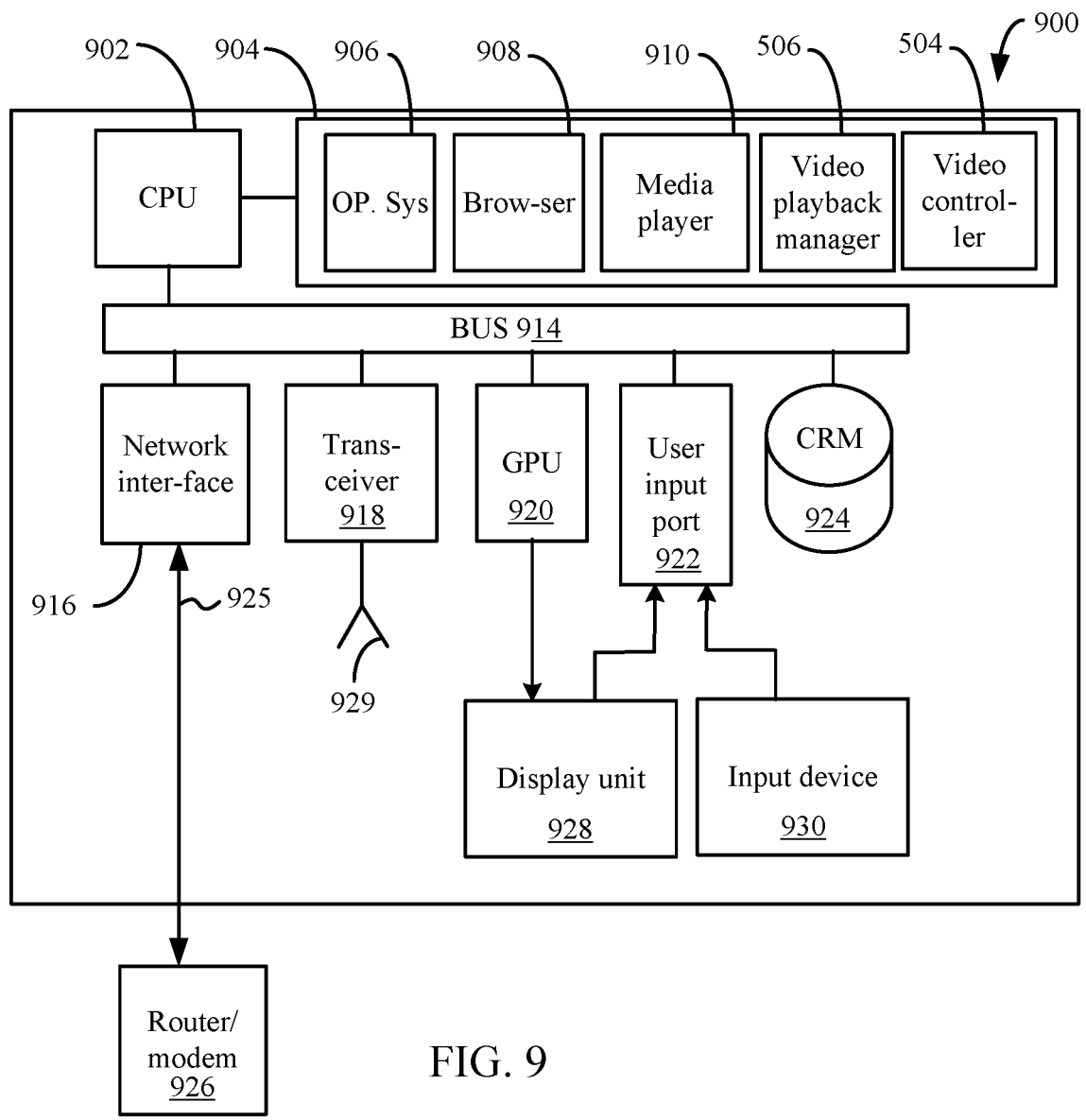
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The modules may further include video controller 504 and video playback manager 506. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium (CRM) in a storage device 924 may be connected to the bus 914 and store static information and instructions for the processor 902; for example, the storage device (CRM) 924 may store the modules 906, 908, 910 and 912 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured to perform one or more operations of a method as described herein.

A communication interface 916 may also be connected to the bus 914. The communication interface 916 may provide or support two-way data communication between the apparatus 900 and one or more external devices, e.g., the streaming system 600, optionally via a router/modem 926 and a wired or wireless connection. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   storing, by a computing device, a second bundle with a first dependency on a first bundle when the second bundle is associated with a first set of control data parameters found in the first bundle that control a first aspect of access to a video entity, wherein the second bundle is stored with a second set of control data parameters to control a second aspect of access to the video entity that is different from the first aspect of access to the video entity;
   storing, by the computing device, a first video file and a second video file for the video entity, wherein the second video file includes different content from the first video file;
   when the second bundle is selected, performing:
      accessing, by the computing device, the first set of control data parameters in the first bundle via the first dependency to the first bundle and the second set of control data parameters for the second bundle; and
      generating, by the computing device, a third set of control data parameters for the second bundle, based on the first set of control data parameters and the second set of control data parameters; and
   using, by the computing device, the first dependency between the first bundle and the second bundle to select a first video file for the video entity for access based on the third set of control data parameters, wherein the first video file is retrieved and used when the first bundle and the second bundle are selected, and wherein a second dependency for the video entity is used to select the second video file, wherein the second video file is retrieved and used when a third bundle for the video entity is selected.

2. The method of claim 1, further comprising:
   when the first bundle is selected or the second bundle is selected, accessing the first video file that is stored based on the first dependency.

3. The method of claim 1, wherein the first set of control data parameters is not stored with the second bundle.

4. The method of claim 3, further comprising:
   storing the first set of control data parameters with the first bundle; and
   accessing the first set of control data parameters that are stored with the first bundle when the second bundle is selected.

5. The method of claim 1, wherein the first bundle and the second bundle use a type of video delivery.

6. The method of claim 1, further comprising:
   when the first bundle is selected, providing the first bundle with the first set of control data parameters for the first bundle to a client for use in playback of the first video file;
   when the second bundle is selected, providing the second bundle with the third set of control data parameters to the client for use in playback of the first video file; and
   when the third bundle is selected, providing the third bundle with a fourth set of control data parameters to the client for use in playback of the second video file.

7. The method of claim 1, further comprising:
   receiving a search request containing a search parameter;
   searching the first set of control data parameters and the second set of control data parameters to select at least one of the first bundle and the second bundle when at least one of the first set of control data parameters and the second set of control data parameters satisfies the search parameter; and
   generating a search result based on the selecting of the at least one of the first bundle and the second bundle.

8. The method of claim 1, wherein the data parameter in the second set of control data parameters includes an access mechanism defining a device that can be used to access the first video file that is different from the data parameter in the first set of control data parameters.

9. The method of claim 1, wherein the data parameter in the second set of control data parameters include an availability parameter that specifies date information restricting access to the first video file by a date that is different from the data parameter in the first set of control data parameters.

10. The method of claim 1, wherein the data parameter in the second set of control data parameters include a location parameter that specifies location information restricting access to the first video file by a location that is different from the data parameter in the first set of control data parameters.

11. The method of claim 1, wherein the data parameter in the second set of control data parameters include a feature rights parameter that specifies feature package restrictions restricting access to the first video file that is different from the data parameter in the first set of control data parameters.

12. The method of claim 1, wherein:
the first bundle allows playback of the first video file using the first set of control data parameters,
the second bundle allows playback of the first video file using the third set of control data parameters, and
the third bundle allows playback of the second video file using a fourth set of control data parameters.

13. The method of claim 1, further comprising:
retrieving the second set of control data parameters from the second bundle;
adding one or more of the first set of control data parameters included in the first bundle to the second set of control data parameters to form the third set of control data parameters for the second bundle; and
sending the second bundle to a client.

14. The method of claim 1, wherein the first aspect of access is based on a first type of video delivery and the second aspect of access is based on a second type of video delivery.

15. A non-transitory computer-readable storage medium containing instructions, that when executed, control a computer system to be configured for:
storing a second bundle with a first dependency on a first bundle when the second bundle is associated with a first set of control data parameters found in the first bundle that control a first aspect of access to a video entity, wherein the second bundle is stored with a second set of control data parameters to control a second aspect of access to the video entity that is different from the first aspect of access to the video entity;
storing a first video file and a second video file for the video entity, wherein the second video file includes different content from the first video file;
when the second bundle is selected, performing:
accessing the first set of control data parameters in the first bundle via the first dependency to the first bundle and the second set of control data parameters for the second bundle; and
generating a third set of control data parameters for the second bundle, based on the first set of control data parameters and the second set of control data parameters; and
using the first dependency between the first bundle and the second bundle to select a first video file for the video entity for access based on the third set of control data parameters, wherein the first video file is retrieved and used when the first bundle and the second bundle are selected, and wherein a second dependency for the video entity is used to select the second video file, wherein the second video file is retrieved and used when a third bundle for the video entity is selected.

16. The non-transitory computer-readable storage medium of claim 15, further configured for:
when the first bundle is selected or the second bundle is selected, accessing the first video file that is stored based on the first dependency.

17. The non-transitory computer-readable storage medium of claim 15, wherein the first set of control data parameters is not stored with the second bundle.

18. The non-transitory computer-readable storage medium of claim 15, further configured for:
storing the first set of control data parameters with the first bundle; and
accessing the first set of control data parameters that are stored with the first bundle when the second bundle is selected.

19. The non-transitory computer-readable storage medium of claim 15, wherein the first bundle and the second bundle use a type of video delivery.

20. The non-transitory computer-readable storage medium of claim 15, further configured for:
when the first bundle is selected, providing the first bundle with the first set of control data parameters for the first bundle to a client for use in playback of the first video file;
when the second bundle is selected, providing the second bundle with the third set of control data parameters to the client for use in playback of the first video file; and
when the third bundle is selected, providing the third bundle with a fourth set of control data parameters to the client for use in playback of the second video file.

21. An apparatus comprising:
one or more computer processors; and
a computer-readable storage medium comprising instructions for controlling the one or more computer processors to be operable for:
storing a second bundle with a first dependency on a first bundle when the second bundle is associated with a first set of control data parameters found in the first bundle that control a first aspect of access to a video entity, wherein the second bundle is stored with a second set of control data parameters to control a second aspect of access to the video entity that is different from the first aspect of access to the video entity;
storing a first video file and a second video file for the video entity, wherein the second video file includes different content from the first video file;
when the second bundle is selected, performing:
accessing the first set of control data parameters in the first bundle via the first dependency to the first bundle and the second set of control data parameters for the second bundle; and
generating a third set of control data parameters for the second bundle, based on the first set of control data parameters and the second set of control data parameters; and
using the first dependency between the first bundle and the second bundle to select a first video file for the video entity for access based on the third set of control data parameters, wherein the first video file is retrieved and used when the first bundle and the second bundle are selected, and wherein a second dependency for the video entity is used to select the second video file, wherein the second video file is retrieved and used when a third bundle for the video entity is selected.

* * * * *